(12) United States Patent
Daigre

(10) Patent No.: US 7,909,414 B2
(45) Date of Patent: Mar. 22, 2011

(54) HYDRAULIC CIRCUIT FOR SPRING APPLIED-HYDRAULICALLY RELEASED BRAKE AND HYDRAULIC MOTOR

(75) Inventor: Richard Daigre, Hopkinsville, KY (US)

(73) Assignee: White Drive Products, Inc., Hopkinsville, KY (US)

(*) Notice: Subject to any disclaimer, the term of this patent is extended or adjusted under 35 U.S.C. 154(b) by 508 days.

(21) Appl. No.: 11/373,318

(22) Filed: Mar. 10, 2006

(65) Prior Publication Data

US 2007/0262639 A1 Nov. 15, 2007

(51) Int. Cl.
*B60T 13/22* (2006.01)
*B60K 7/00* (2006.01)
(52) U.S. Cl. .................. 303/71; 303/9.61; 180/308
(58) Field of Classification Search ............ 303/3, 9.61, 303/15, 71; 188/170; 180/306, 308, 405; 60/403, 488; 92/130 A
See application file for complete search history.

(56) References Cited

U.S. PATENT DOCUMENTS

| | | | | |
|---|---|---|---|---|
| 3,759,357 | A | * | 9/1973 | Bianchetta ............... 477/199 |
| 3,976,333 | A | * | 8/1976 | Fillion et al. ............ 303/2 |
| 4,019,321 | A | * | 4/1977 | Aoyama et al. ............ 60/484 |
| 4,119,355 | A | | 10/1978 | Kreitner |
| 4,163,584 | A | * | 8/1979 | Koenig ............... 303/7 |
| 4,169,633 | A | | 10/1979 | Stearns |
| 4,195,716 | A | | 4/1980 | Wirt |
| 4,254,845 | A | * | 3/1981 | Braun ............... 180/306 |
| 4,307,917 | A | | 12/1981 | Hasselbacher et al. |
| 4,317,331 | A | | 3/1982 | Aruga et al. |
| 4,324,098 | A | * | 4/1982 | Aruga et al. ............... 60/420 |
| 4,451,095 | A | * | 5/1984 | Chichester et al. ............ 303/71 |
| 4,481,769 | A | * | 11/1984 | Nagahara ............... 60/441 |
| 4,495,767 | A | * | 1/1985 | Akiyama et al. ............ 60/436 |
| 4,543,786 | A | * | 10/1985 | Shuler ............... 60/435 |
| 4,729,222 | A | * | 3/1988 | Tanaka et al. ............... 60/436 |
| 4,813,518 | A | | 3/1989 | Akiyama et al. |
| 4,858,435 | A | | 8/1989 | Ikeda |
| 5,069,037 | A | * | 12/1991 | Sakigawa et al. ............ 60/435 |
| 5,895,099 | A | * | 4/1999 | Diecke et al. ............ 303/9.61 |
| 5,984,425 | A | * | 11/1999 | Orzal ............... 303/3 |
| 6,050,091 | A | * | 4/2000 | Maruta ............... 60/436 |
| 6,135,580 | A | * | 10/2000 | Denning ............... 303/151 |

(Continued)

FOREIGN PATENT DOCUMENTS

JP 4-102762 4/1992

(Continued)

OTHER PUBLICATIONS

U.S. Appl. No. 11/346,513, filed Feb. 2, 2006.

*Primary Examiner* — Bradley T King
*Assistant Examiner* — Thomas Irvin
(74) *Attorney, Agent, or Firm* — Rankin Hill & Clark LLP

(57) ABSTRACT

A hydraulic circuit includes a spring applied-pressure released brake, a hydraulic motor, and a control in fluid communication with the brake and the motor. The control is operative between a first position and a second position. When in the first position the brake receives pressure from a first brake pressure source. When in the second position the brake receives pressure from a second pressure source and the motor is short circuited in relation to a motor pressure source. The control can be automatically reset upon pressurization of the hydraulic circuit.

21 Claims, 8 Drawing Sheets

U.S. PATENT DOCUMENTS

| | | |
|---|---|---|
| 6,675,576 B2 | 1/2004 | Bigo et al. |
| 6,688,419 B2 * | 2/2004 | Eriksen et al. ............... 180/308 |
| 6,698,196 B2 * | 3/2004 | Hashimoto et al. ............ 60/443 |
| 6,988,580 B2 * | 1/2006 | Ohashi et al. ................ 180/307 |
| 7,722,131 B2 * | 5/2010 | Daigre ........................... 303/71 |
| 2005/0236214 A1 * | 10/2005 | Ohashi et al. ................ 180/305 |
| 2009/0160246 A1 * | 6/2009 | Daigre ........................... 303/80 |

FOREIGN PATENT DOCUMENTS

| | | |
|---|---|---|
| WO | WO 2004/041610 | 5/2004 |

\* cited by examiner

HYDRAULIC CIRCUIT FOR SPRING APPLIED-HYDRAULICALLY RELEASED BRAKE AND HYDRAULIC MOTOR

BACKGROUND OF THE INVENTION

When a hydraulic system failure occurs or when the engine of the prime mover is not running to drive the pump for a brake system having spring applied-pressure released brakes, the brakes are spring applied by the loss of hydraulic pressure. When such a loss of pressure occurs, a vehicle of this type cannot be towed to a suitable repair station until the brakes are again pressurized, thus releasing the brakes.

Manual pumps are used to pressurize and release the brakes. These known manual pumps typically include at least three ports: a pressure port, a brake port, and a tank port. In these known manual pumps, when one is manually pumping to pressurize the brakes, the pressure port is typically blocked and hydraulic fluid is drawn from the tank to pressurize the brake. One known manual pump includes more than one rod, i.e. a first rod that acts as a piston for the manual pump and a second rod that acts as spool of a valve to block flow from the pressure port to the brake port. Another known manual pump includes valves in combination with rods. The valves require the operator to turn or adjust the valves to block flow from the pressure port to the brake port. Both of these known manual pumps require a complex manifold structure to provide the proper fluid communication between the ports in different operating modes and also require operator training to know which rods to push or which valves to turn.

Many vehicles that employ spring applied-pressure released brakes also employ hydraulic motors to drive the vehicle. When the engine is not running to drive the pump for the hydraulic motors, typically a shut-off valve is disposed in the hydraulic circuit to block the flow of hydraulic fluid through the hydraulic motors thus prohibiting rotation of the hydraulic motor and thus the vehicle. These hydraulic motors can also be used to perform dynamic braking to stop the vehicle. Dynamic braking is also performed by blocking flow through the motors so that the motors cannot rotate. Release valves or counter-balance valves can be disposed in the circuit to dump the flow of hydraulic fluid during dynamic braking so that the hydraulic motors do not come to an abrupt halt.

As stated above, when the engine is not running or a hydraulic system failure has occurred the flow of hydraulic fluid through the motors stops and, therefore, blocks, or greatly inhibits, rotation of the hydraulic motors. When the vehicle that includes these hydraulic motors needs to be moved, the shut-off valve can be short circuited to allow for the movement of fluid through the hydraulic motors. Typically, a needle valve is located in the hydraulic circuit remote from the aforementioned manual pump used to pressurize the brakes. Accordingly, to move a vehicle that includes spring applied-pressure released brakes and hydraulic motors that are blocked upon loss of pressure, one must pressurize the brakes using a manual pump and move to another location on the vehicle to open a needle valve to short circuit the shut-off valve that blocks flow through the motors.

SUMMARY OF THE INVENTION

According to one embodiment, a hydraulic circuit includes a spring applied-pressure release brake, a hydraulic motor, and a control in fluid communication with the brake and the motor. The control is operative between a first position and second position. When the control is in the first position and in response to a pressure loss upstream of the motor, movement of the fluid through the motor is inhibited such that rotation of an output shaft of the motor is also inhibited. When the control is in the first position and in response to a pressure loss upstream of the brake, the brake is spring applied. When the control is in the second position the brake communicates with an auxiliary pressure source for selectively supplying pressure to the brake. When the control is in the second position and in response to pressure being applied upstream of the control, the control is automatically reset to the first position.

In another embodiment, a hydraulic circuit includes a spring applied-pressure released brake, a hydraulic motor, and a control in fluid communication with the brake and the motor. The control includes a valve operative between a first position and a second position. When in the first position, the brake receives pressure from a first brake pressure source. When in the second position the brake receives pressure from a second pressure source and the motor is short circuited in relation to a motor pressure source. In response. to a pressure loss in the circuit while in the first position, the brake is in communication with the motor.

A prime mover including a hydraulic motor, a bypass conduit in communication with the motor, a spring applied-pressure released brake, a first pressure source, a second pressure source and a control in fluid communication with the bypass conduit, the brake, the first pressure source and the second pressure source is disclosed. The control operates between a first position and a second position. When the control is in the first position the control couples the brake to the first pressure source and the bypass conduit is blocked in the control. When in the second position the control couples the brake to the second pressure source and the second pressure source draws fluid from upstream the first pressure source. Also when in the second position, the bypass conduit communicates with a bypass outlet of the control.

DETAILED DESCRIPTION

Figure 1:
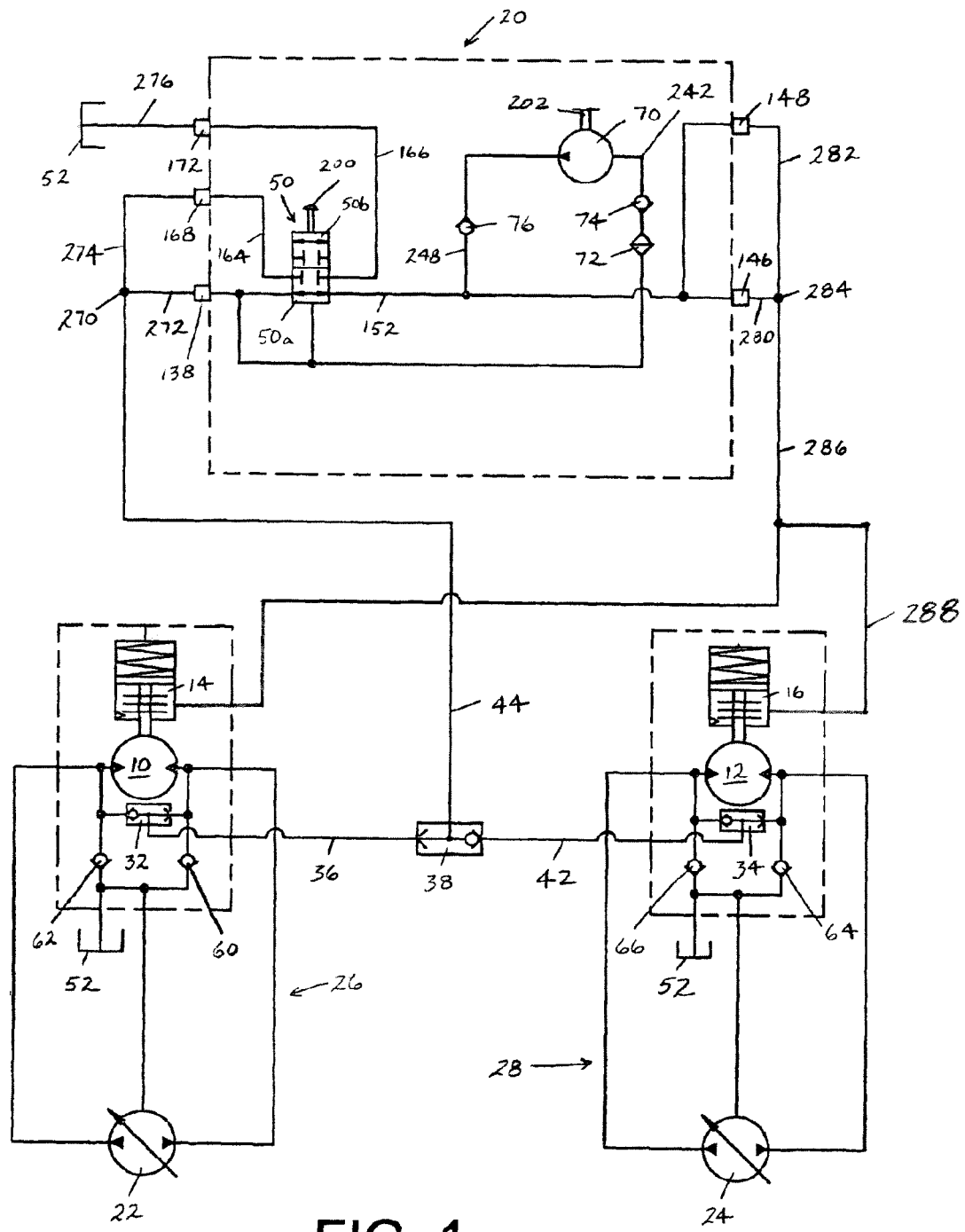
FIG. 1 is a schematic drawing of a hydraulic circuit for spring applied-pressure released brakes and hydraulic motors.

With reference to FIG. 1, a hydraulic circuit is shown including first and second hydraulic motors 10 and 12, respectively, first and second spring applied-pressure released brakes 14 and 16, respectively and a control 20 to release the brakes 14 and 16 and the motors 10 and 12 so that a prime mover that includes the hydraulic circuit can be moved without power. Each motor 10 and 12 drives a wheel (not shown) in a manner that is known. Each brake 14 and 16 stops rotation of an output shaft of the respective motor, and thus the respective wheel, in a manner that is known. As will be explained below, use of the control 20 allows a simple release of both brakes 14 and 16 and a short circuit of the hydraulic motors 10 and 12. This circuit also allows for the automatic reset of the control 20 with the application of hydraulic pressure to either the first motor 10 or the second motor 12 or upon manual actuation, which will be described in more detail below. In this circuit, the brakes 14 and 16 can apply when both wheel circuits have no pressure and release when either wheel circuit 26 and/or 28 has pressure. Also, this hydraulic circuit allows the operator of the prime mover to dismount the prime mover while it remains running. The hydraulic circuit is described as including two motors and two hydraulic brakes; however, a fewer or greater number of motors and/or brakes can be provided without departing from the scope of the invention.

With continued reference to FIG. 1, a first adjustable flow rate reversible pump 22 delivers pressure to drive the first motor 10. Similarly, a second adjustable flow rate reversible pump 24 delivers pressure to the second motor 12. The first motor 10 and the first pump 22 can be described as operating within a first wheel circuit 26 and the second motor 12 and the second pump 24 can be described as working in a second wheel circuit 28. In the depicted embodiment, the wheel circuits 26 and 28 have the same configuration.

In the first wheel circuit 26, a first shuttle valve 32 communicates with the first motor 10 and the first pump 22. The position of the first shuttle valve 32, e.g. the position of a check ball disposed in the shuttle valve, is dependent upon the direction of flow through the first motor 10. Similarly, a second shuttle valve 34 is disposed in the second wheel circuit 28 and communicates with the second motor 12 and the second pump 24 in a manner similar to the first shuttle valve 32. A first passage 36, which can be referred to as part of a bypass conduit, connects the first shuttle valve 32 to a third shuttle valve 38. Similarly, a second passage 42, which can also be referred to as part of the bypass conduit, connects the second shuttle valve 32 to the third shuttle valve 38. The third shuttle valve 38 precludes direct communication between the first wheel circuit 26 and the second wheel circuit 28 so that a short circuit does not develop between the first motor 10 and the second motor 12. The operating position of the shuttle valve 38 is a function of the pressure differential between the first wheel circuit 26 and the second wheel circuit 28, which can be a function of the operating pressure of the function to the shuttle valves can be used instead of the shuttle valves that are disclosed.

The first wheel circuit 26 and the second wheel circuit 28 each communicate with the control 20 through the shuttle valve 38 and a conduit 44. The control 20 includes a valve 50 that operates between a first operating position 50a and a second operating position 50b. In the first operating position, the pumps 22 and 24, depending on which pump is operating at a higher pressure in its respective wheel circuit, delivers fluid pressure to each of the brakes 14 and 16 through the valve 50. If the hydraulic circuit were to experience a pressure loss, for example when the engine of the prime mover is not running to drive either pump 22 or 24 or when one of the lines or components in the hydraulic circuit have lost pressure, the springs located in the brakes 14 and 16 would overcome any hydraulic fluid located in the pressurized chamber of the brake. Accordingly, upon pressure loss fluid would move through the system from the brakes 14 and 16 through the control 20, which contains the valve 50, and towards one of the hydraulic motors 10 and 12 (dependent upon the position of the shuttle valve 38) where the hydraulic fluid may leak from the motor into the ambient or into a reservoir, such as a tank 52.

While the valve 50 is in the first position and there has been a loss of pressure in the circuit, the motors 10 and 12 will be inhibited from rotating, not only by the actuation of the brakes 14 and 16, but also by the design of the circuit. Any rotation of the motor, either motor 10 or motor 12, by towing of the vehicle in which the circuit is disposed would result in the motor acting as a pump. Accordingly, when the wheel that is attached to the motor is rotated fluid would want to travel through the motor as its output shaft is rotated. When there is a loss of pressure, fluid is precluded from moving through the pumps 22 and 24 due to the design of these pumps. Accordingly, fluid would travel towards the first shuttle valve 32 from the first motor 10 and towards the second shuttle valve 34 from the second motor 12. With respect to the first wheel circuit 26 fluid would be precluded from traveling towards the tank 52 by check valves 60 and 62. Likewise, for the second wheel circuit 28 fluid would be precluded from traveling into the tank 52 by check valves 64 and 66. Accordingly, fluid would travel from the first motor 10 through the first shuttle valve 32 and toward the third shuttle valve 38 and thus towards the control 20 through conduit 44. Similarly, fluid would travel through the second shuttle valve 34 in the second motor 28 towards the third shuttle valve 38 and towards the control 20 through the conduit 44. While the valve 50 is in the first position 50a, communication between the first and second wheel circuits 26 and 28 and the tank 52 is blocked. Accordingly, fluid is precluded from traveling through this path. Upon rotation of the motors 10 and 12, fluid can also pass through the valve 50 towards the brakes 14 and 16; however, at that time the spring is actuated and the hydraulic fluid pressure that is provided via the motors rotating does not overcome the pressure of the spring and therefore the flow of fluid through the motors 10 and 12 is inhibited.

The control 50 can be moved from the first operating position 50a to the second operating position 50b when there has been a loss in pressure in the circuit. When in the second operating position 50b, hydraulic motors 10 and 12 are in fluid communication with the tank 52 through the valve 50. Accordingly, fluid can easily move through both of the motors 10 and 12 into the tank 52 upon rotation of the output shaft.

While in the second operating position 50b, the pumps 22 and 24 are isolated from the brakes 14 and 16 through the valve 50. An auxiliary pressure source 70, e.g. a hand pump, is provided to pressurize the brakes 14 and 16. Instead of communicating with the tank 52, the pump 70 draws fluid from upstream the main pumps 22 and 24 through a filter 72 and a check valve 74. The auxiliary pump 70 pushes the fluid through another check valve 76 and towards the brakes 14 and 16 since the line leading back to the valve 50 is blocked when the valve is in the second operating position 50b.

Figure 2:
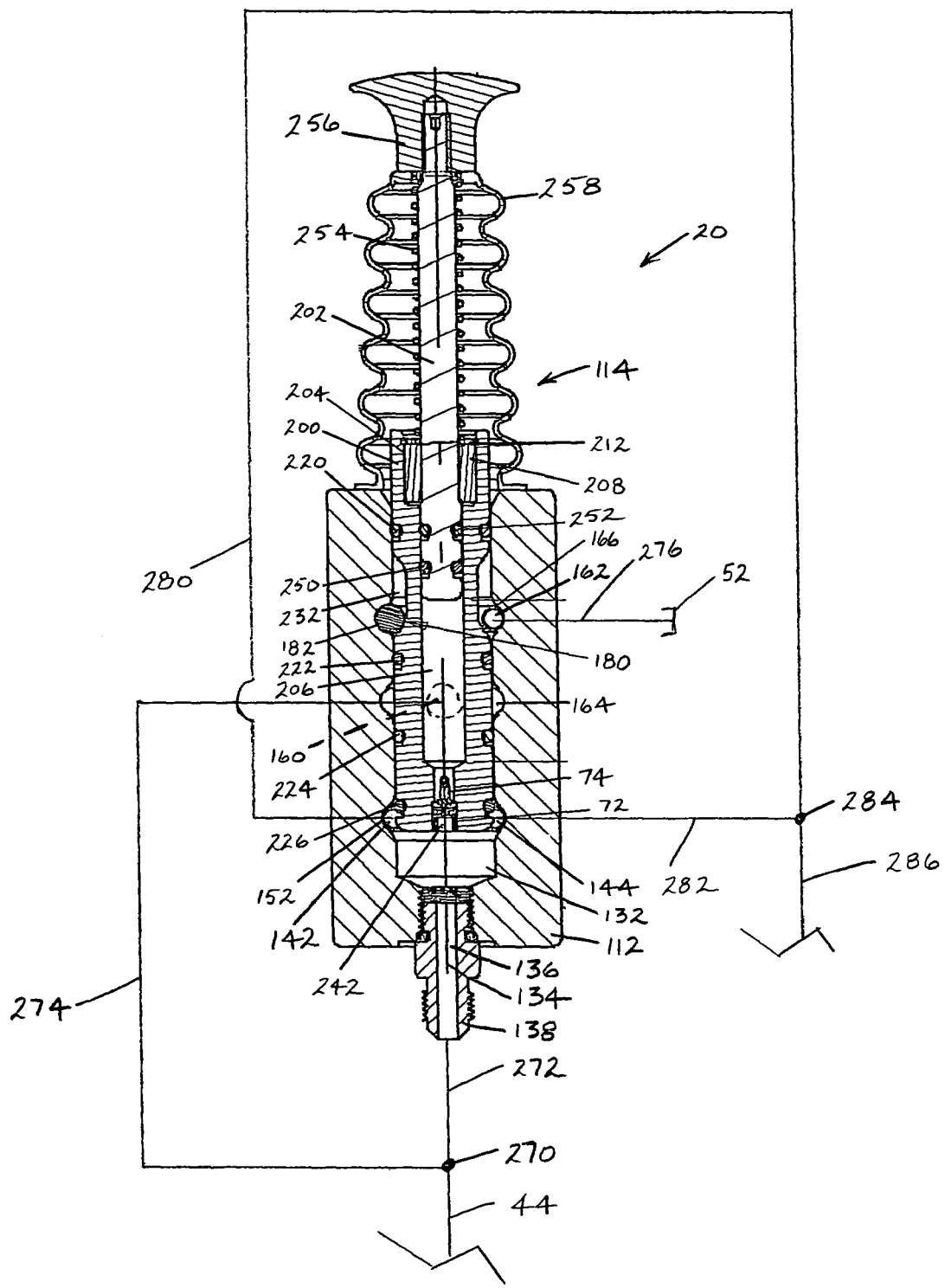
FIG. 2 is a cross-sectional view of a control for use in the hydraulic circuit depicted in FIG. 1 with portions of the hydraulic circuit schematically depicted. The control is shown in a first operating position.

With reference to FIG. 2, the control 20 for a hydraulic circuit generally includes a-manifold housing 112 and a movable member 114, which will also be referred to as a pump rod subassembly. The control 20 is not limited to only the configuration that is disclosed.

Figure 3:
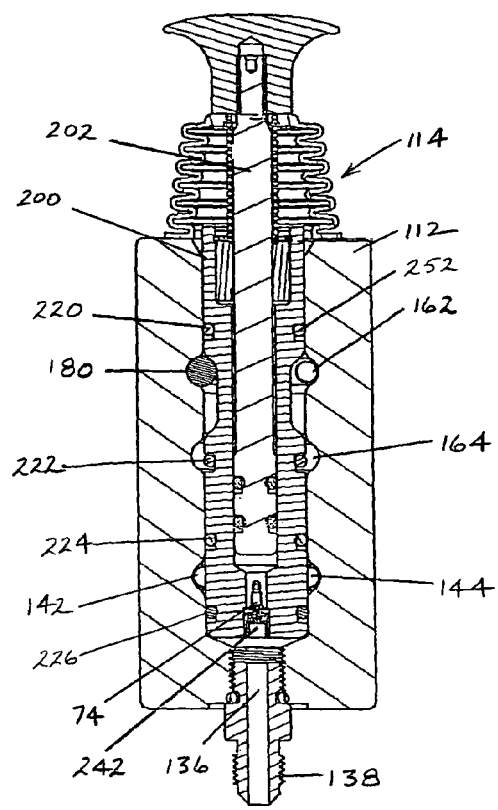
FIG. 3 is cross-sectional view of the control of FIG. 2 shown in a second operating position.
Figure 4:
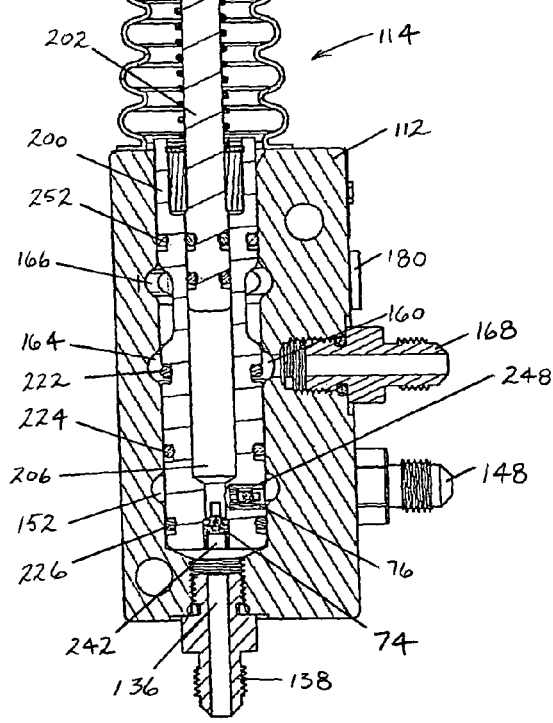
FIG. 4 is a cross-sectional view taken 90° from the cross-sectional view shown in FIG. 3 where the control is shown in the second operating position and an inner rod of the control is extended to depict a pumping action.

The control 20 is movable between a first mode of operation (depicted in FIG. 2 and equivalent to first operating position 50a in FIG. 1) and a second mode of operation (depicted in FIGS. 3 and 4 and equivalent to the second operating position 50b in FIG. 1). The first mode, or position, allows for fluid communication between a pressure source, e.g. pumps 22 and 24, and spring applied-pressure released brakes 14 and 16. While in the first mode of operation, the hydraulic motors 10 and 12 are isolated from the tank 52.

With continued reference to FIG. 2, the manifold housing 112 includes a central bore, or cavity, 132 that receives a portion of the pump rod subassembly 114. In the depicted embodiment, the central bore 132 is substantially cylindrical and axially symmetric about a longitudinal axis 134 of the manifold housing 112. In the depicted embodiment, the central bore 132 does not extend entirely through the manifold housing 112, but instead ends near a lower portion of the housing (as depicted in FIG. 2).

The manifold housing 112 also includes a plurality of ports and passages that are in communication with the central cavity 132. The ports and passages will be described as having certain configurations. The invention is not limited to only the configurations that are described below and depicted in the figures. To the contrary, the invention is defined by the appended claims.

A pressure port 136 communicates with a lower portion of the cavity 132. A pressure port fitting 138 is received inside the pressure port 136 to allow for a hose, which will be described in more detail below, to connect the pumps 22 and 24 (FIG. 1) to the pressure port 136. A first brake port 142 and a second brake port 144 also communicate with the cavity 132. As more clearly seen in FIG. 5, first and second brake port fittings 146 and 148 are received in the respective brake ports. The brake port fittings allow for hydraulic hoses, or other device for carrying hydraulic fluid which will be described below, to connect the brakes 14 and 16 to the control 20. An annular groove 152, which will be referred to as the lower annular groove, is machined out of the manifold housing 112, or formed in another manner, to allow for fluid communication between the brake ports 142 and 144 and the cavity 132.

With continued reference to FIG. 2, the control 20 also includes a first motor port 160 that is in fluid communication with the bore 132 and a second motor port 162 that is also in communication with the bore 132. In the depicted embodiment, the first motor port 160 is spaced from the second motor port 162 along the central axis 134. A second annular groove 164, which will be referred to as the intermediate annular groove, is machined in the manifold housing 112 to allow for fluid communication between the first motor port 160 and the internal bore 132. Similarly, a third annular groove 166, which will be referred to as the upper annular groove, is also machined into the manifold housing 112 to provide fluid communication between the second motor port 162 and the internal bore 132. The upper annular groove 166 is spaced from the intermediate annular groove 164 along the central axis 134 of the manifold housing 112. As more clearly seen in FIG. 5, a first motor port fitting 168 allows for a fluid hose, or other device, to connect to the first motor port 160 (FIG. 2). Similarly, a second motor port fitting 172 allows for the connection of a hydraulic hose, or similar fluid carrying device, to the manifold housing 112 to allow for fluid communication with the second motor port 162 (FIG. 2).

The invention is not limited to the exact locations of the ports and fittings as shown in the figures. To the contrary, the location of the ports and fittings can be elsewhere.

A pin 180 is received in a transverse, e.g. radial, bore 182 of the manifold housing 112. The transverse bore 182 intersects the upper annular groove 166. The pin 180 limits the linear movement of the pump rod assembly 114 in the manifold housing 112 in a manner that will be described in more detail below. Other means of retaining the movable member may also be used.

With continued reference to FIG. 2, the pump rod assembly 114 includes an outer rod, or spindle, 200 and an inner rod 202 that is received inside the outer rod. The push rod assembly 114, and more specifically the spindle 200, is moveable between a first operating position, as shown in FIG. 2, and a second operating position as shown in FIGS. 3 and 4.

The outer rod 200 includes a first, i.e. upper, counterbore 204 and a second, i.e. lower, coaxial counterbore 206 that has a smaller diameter and extends further into the outer rod 200 as compared to the first counterbore 204. The upper counterbore 204 receives a bushing 208. The bushing 208 receives the inner rod 202 and protects the inner rod from wear and also retains the inner rod. A snap ring 212 contains the bushing 208 inside the upper counterbore 204. The lower counterbore 206 receives the inner rod 202 to define a pump chamber of the pump 70 (depicted schematically in FIG. 1). The dimensions of the inner rod 202 and the lower counterbore 206 can change, for example, where it is desirable to provide a larger pump chamber.

The outer rod 200 also includes a plurality of annular grooves. Each groove is configured to receive a seal. The seals are spaced from one another along the axis 134. The seals isolate the annular grooves that are formed in the manifold housing 112, i.e. lower annular groove 152, intermediate annular groove 164 and upper annular groove 166, from one another. In the depicted embodiment, there are four seals: a first (upper) seal 220, a second (upper intermediate) seal 222, a third (lower intermediate) seal 224, and a fourth (lower) seal 226. Each seal contacts an inner surface of the internal bore 132 of the manifold housing 112.

The outer rod 200 also includes an elongated annular notch 232 machined into the outer rod. The elongated notch 232 cooperates with the pin 180 to limit upward movement of the outer rod 200 when pressure is applied to the pressure port 136. The pin 180 also limits downward movement of the outer rod 200. In the depicted embodiment, the pin 180 limits downward movement of the outer rod 200, as opposed to the bottom of the cavity 132 limiting the downward movement. In the depicted embodiment, the elongated notch 232 has a dimension that is parallel with the axis 134, i.e. axial dimension, that is about equal to the distance between the lower planar surface of the outer rod 200 and the bottom of the central bore 132 of the manifold housing 112, although such a configuration is not required.

With reference to FIGS. 1 and 2, the first valve 74, which in the depicted embodiment is a one-way check valve, is inserted into an axial passage 242 of the outer rod 200. The filter 72 can also be disposed adjacent the one-way check valve 74. The passage 242 communicates with the lower counterbore, i.e. pump chamber 206, of the outer rod 200. With reference to FIG. 4, the second one-way check valve 76 is disposed in a radial passage 248 in the outer rod 200. The passage 248 communicates with the pump chamber 206. The flow of hydraulic fluid through these check valves will be described in more detail below.

As explained above and with reference back to FIG. 2, the inner rod 202 is received in the second bore 206 of the outer rod 200. The inner rod 202 includes annular grooves that are spaced from one another along the central axis 134. A lower annular groove receives a first (lower) seal 250 and an upper groove receives a second (upper) seal 252. Two seals are provided to encourage the generation of a vacuum during manual pumping, which will be described in more detail below.

A biasing member, e.g. a spring, 254 biases the inner rod 202 out of the second counterbore 206 of the outer rod 200. The biasing member contacts the bushing 208 and a handle 256 disposed at an end of the inner rod 202 opposite the seals 250 and 252. A bellows 258 surrounds the inner rod 200 and the spring 254 between the handle 256 and the manifold housing 112. An alternative biasing member, e.g. a bellows spring, can bias the inner rod 202 out of the second counterbore 206 of the outer rod 200. Use of the bellows spring can obviate use of the spring 256; however, the bellows springs can be used in addition to the spring.

As explained above, the control 20 operates between a first operating position (FIG. 2) and a second operating position (FIG. 3). In the first operating position the primary pressure source, i.e. pumps 22 and 24 (FIG. 1), communicate with the brakes 14 and 16 (FIG. 1) via the pressure port 136 and the brake ports 142 and 144. As more clearly seen in FIG. 2, when in the first operating position the lower seal 226 resides in the lower annular groove 152. Alternatively, the lower seal 226 can contact the outer rod 200 above the lower annular groove 152 and the manifold housing 112 to isolate the hydraulic fluid from the remainder of the ports. Also while in the first operating position, the first motor port 160 is isolated from the second motor port 166 by the upper intermediate seal 222. Furthermore, the lower intermediate seal 224 further isolates the first motor port 160 from the brake ports 142 and 144. Accordingly, pressure is delivered from the pumps 22 and 24 through the motors 10 and 12 through lines 36 and 42 (FIG. 1) toward the third shuttle valve 38 (FIG. 1). With reference back to FIG. 1, from the third shuttle valve 38 fluid passes through line 44 and splits at a fitting 270 into a pressure brake line 272 and a pressure motor line 274. The pressure brake line 272 connects to the pressure port fitting 138. The pressure motor line 274 connects to the first motor port fitting 168. With continued reference to the first operating position, fluid that enters the control 20 through the first motor port fitting 138 is blocked from traveling to the second motor port 162 (FIG. 2) and thus out a motor/tank line 276, which is connected to the tank 52 and the second motor port fitting 172. While in the first operating position, pressurized fluid can travel from the brake pressure line 272 through the control 20 and out brake port fittings 146 and 148. A first brake line 280 connects to the first brake fitting 146 and a second brake line 282 connects to the second brake fitting 148. The first and second brake lines connect at a fitting 284 to a main brake line 286. Another brake line 288 branches off to connect to the second brake 16 and the main brake line continues to the first brake 14. If desired, only one brake port may be provided to provide pressure to both brakes 14 and 16 or two separate brake lines may be used.

When pressure is not being applied to the brakes 14 and 16 via either pump 22 or 24, the springs in the brake actuate. With reference to FIG. 3, when pressure is not being supplied to the pressure port 136, the push rod assembly 114 can be moved into the second operating position that is shown in FIG. 3. In this operating position, the brake ports 142 and 144 are isolated from the pressure port 136 by the lower seal 226 being disposed below the lower annular groove 152. The first one-way check valve 74 allows for fluid to be drawn upstream from the pumps 22 and 24 into the second bore 206 of the outer rod 200 upon upward movement (as per the orientation shown in FIG. 4) of the inner rod 202. With reference to FIG. 4, downward movement of the inner rod 202 results in fluid passing through the second one-way check valve 76 into the lower annular groove 152 and thus into the brake ports 142 and 144. Accordingly, by pumping the inner rod 202 while the outer rod 200 is in the second operating position, pressure can be applied to the brakes 14 and 16 thus releasing the springs. In other words, fluid is allowed to travel from upstream of the pump 70 (FIG. 1) and through the first check valve 72; however, the first check valve prohibits flow from the auxiliary pump 70 towards the primary pumps 22 and 24. Also, fluid is allowed to travel from the auxiliary pump 70 towards the brakes 14 and 16 through the second check valve 76; however, the second check valve prohibits fluid from traveling from the brakes 14 and 16 toward the pump 70. In the depicted embodiment, while the control 20 is in the first position fluid can enter the pump chamber 206 through the first valve 74 and leak into the lower annular groove 152 through the second valve 76 (FIG. 4).

While no pressure is being applied by the pumps 22 and 24, the motors 10 and 12 in the depicted configuration will not turn while the control 20 is in the first operating position (FIG. 2). This is because line 274 (FIG. 1) is blocked from line 276 and the motors 10 and 12 can no longer communicate with the tank 52. Accordingly, fluid does not travel through the motors and the motors do not rotate. With reference to FIG. 3, when the outer rod 200 is pushed into the second operating position, the upper intermediate seal 222 moves below and/or into the intermediate annular groove 164 so that the first motor port 160 can communicate with the second motor port 168. Thus, while in the second operating position, the pumps 22 and 24, which are configured to block flow when not running, are short circuited and the motors 10 and 12 can communicate with the tank 52 via the control 20 so that they can rotate. As seen in FIG. 4, the upper seal 220 is maintained above the second motor port 166 so that communication is allowed between the first motor port 160 and the second motor 166 while fluid does not escape internal bore 132 of the manifold housing 112.

The control 20 is automatically reset upon pressurization of the pressure port 136. Pressurization of the pressure port 136 results in the outer rod 200 moving upward so that the pumps 22 and 24 can communicate with the brakes 14 and 16 via the brake ports 142 and 144. The pin 180 cooperates with a lower portion of the annular notch 232 formed in the outer rod 200 to limit further movement of the outer rod so that it does not travel out of the manifold housing 112 upon pressurization by the pumps 22 and 24.

Figure 5:
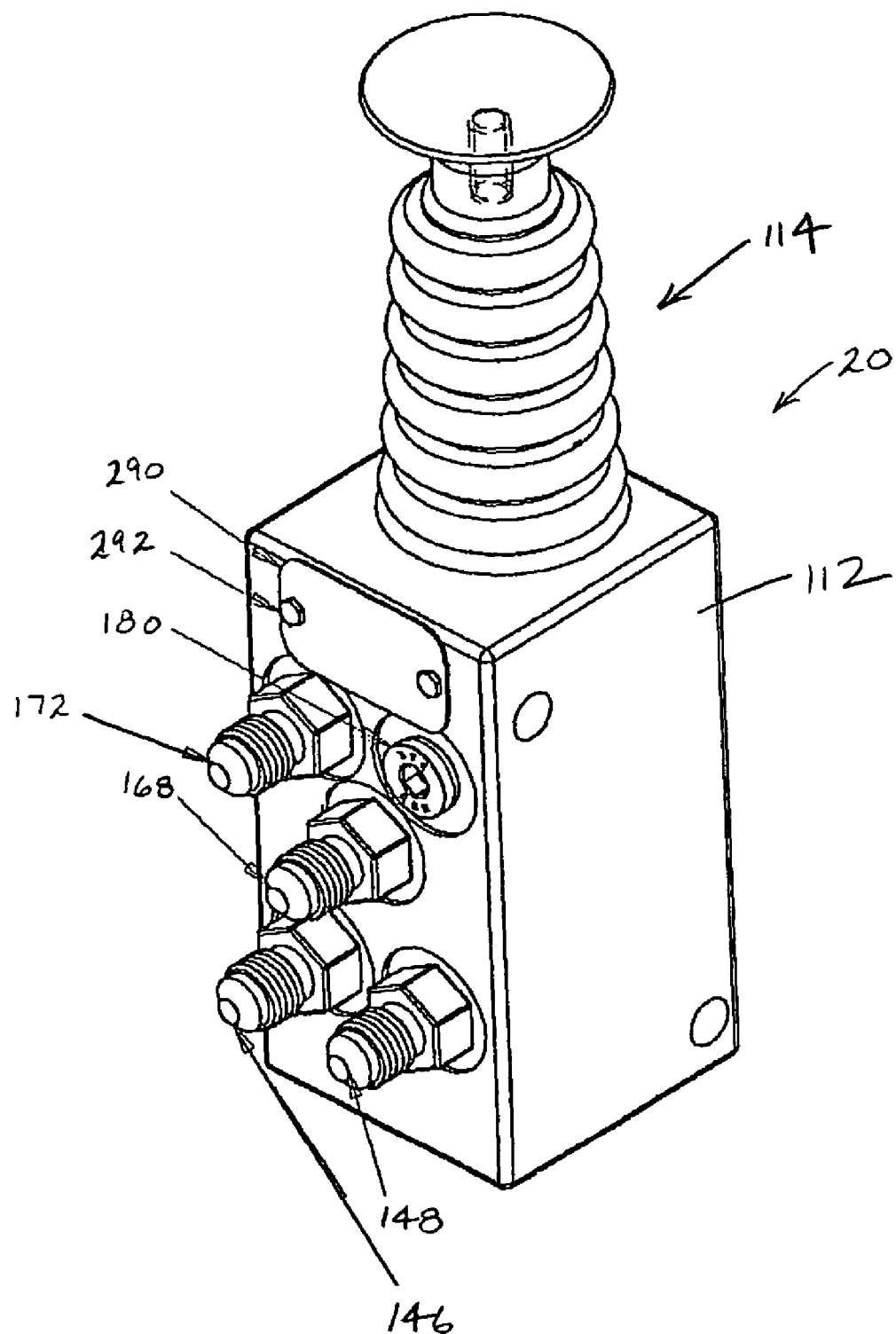
FIG. 5 is a perspective view of the control depicted in FIGS. 2-4.

As seen in FIG. 1, the control unit 20 can be a stand alone unit that allows for the connection of pressure hoses. Nevertheless, the pump rod assembly 114 can be dropped into an existing manifold (some ports and passages in the manifold may need to be machined) such that the pump rod assembly 114 acts as a sort of cartridge valve. In other words, the housing for the control is not limited to the housing as shown in FIG. 5. Instead, the housing can be an existing manifold or it can take some other configuration.

The control allows the operator of a prime mover to manually pressurize spring actuated-pressure released brakes by moving a single movable member. Accordingly, the control can be housed in a compact housing as compared to known manual pumps that are used to manually pressurize brakes. Furthermore, this single shaft control unit can draw fluid downstream from the pump, as opposed to from the tank, to pressurize the brakes thus simplifying the construction as compared to known pumping devices. Adequate fluid is located in the circuit between the pump and the control to pressurize the brakes. Additionally, downward movement of the shaft also allows the hydraulic motors to rotate freely; therefore, the operator of the prime mover need not turn an additional needle valve to allow for free rotation of the hydraulic motors.

With reference to FIG. 5, a name plate 290 attaches to the manifold housing 112 using fasteners 292. The name plate can carry indicia regarding the source of the control, as well as other information.

Figure 6:
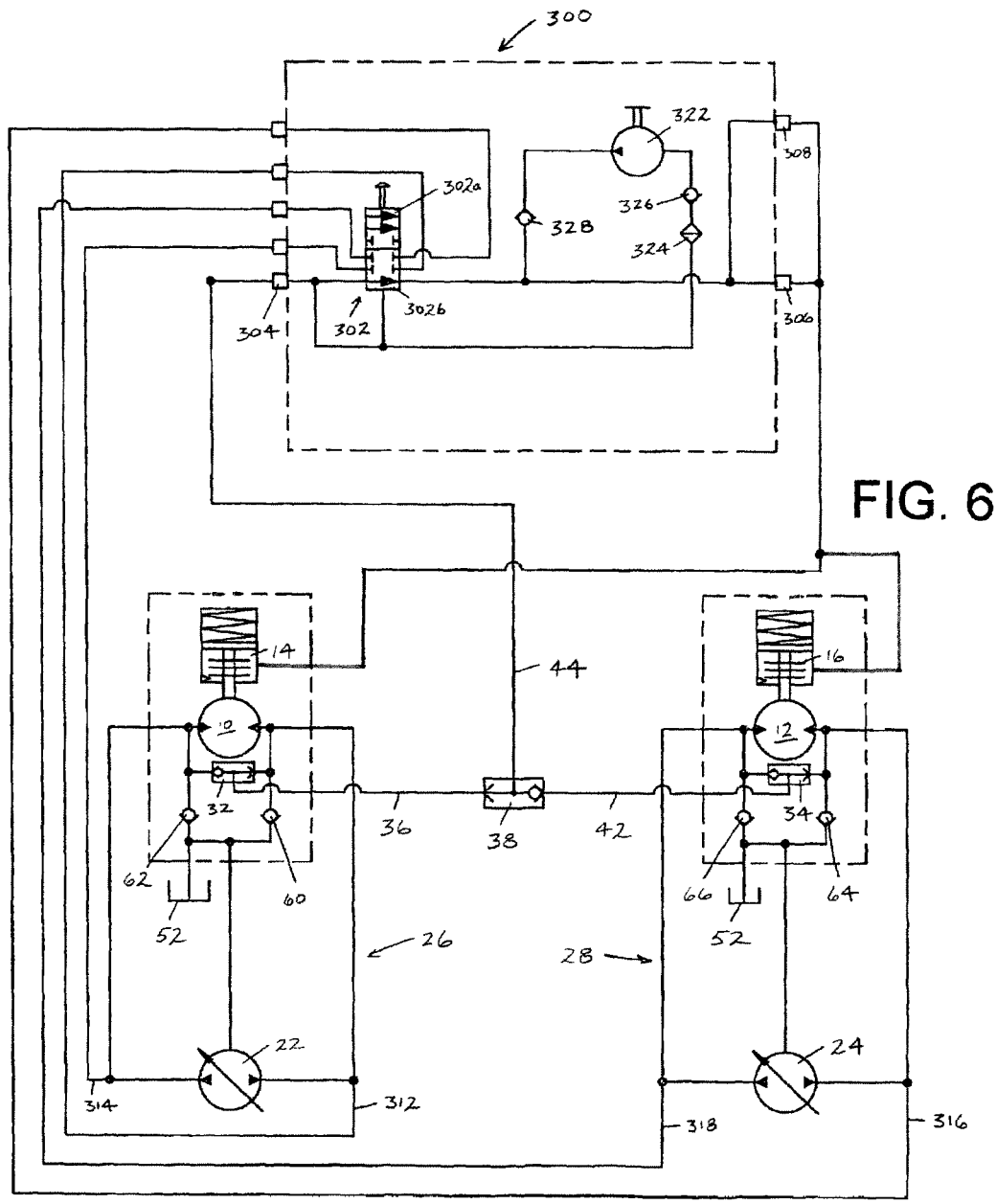
FIG. 6 is an alternative embodiment of a hydraulic circuit for a spring applied-pressure released brake and a hydraulic motor.

With reference to FIG. 6, an alternative embodiment of a hydraulic circuit that allows for the release of spring applied hydraulically released brakes and the hydraulic motors is disclosed. The configuration of the wheel circuits for the hydraulic circuit depicted in FIG. 6 is the same as for the hydraulic circuit depicted in FIG. 1 and therefore the same reference numerals will be used. In the circuit depicted in FIG. 6, a control 300 is used to release the brakes 14 and 16 and short circuit the motors 10 and 12 with respect to their respective pumps 22 and 24.

The control 300 includes a two position valve 302 having a first operating position 302a and a second operating position 302b. In the first operating position, the brakes 14 and 16 receive pressure from primary pressure sources, e.g. pumps 22 and 24, in much the same manner as was described with reference to the circuit disclosed in FIG. 1. Fluid travels from the motors 10 and 12 through lines 36 and 42 and into the shuttle valve 38. Whichever wheel circuit is operating at a greater pressure delivers fluid to line 44 which connects to a brake pressure port 304 that is in communication with the valve 302. With the valve 302 in the first operating position 302a, fluid travels through the pressure port 304, through the valve 302 and into respective brake ports 306 and 308 towards the brakes 14 and 16 in a manner similar to the hydraulic circuit described with reference to FIG. 1.

When pressure is lost in the circuit, the springs in the brakes 14 and 16 apply thus inhibiting rotation of the output shafts of the respective motors 10 and 12. When the valve 302 is in the first operating position 302a and fluid pressure is lost in the circuit, fluid travel through the motors 10 and 12 is also inhibited. A first short circuit line 312 connects to the first wheel circuit 26 on a first side the pump 22 and a second short circuit line 314 connects to the wheel circuit 26 on an opposite side (either upstream or downstream depending on the direction of flow through the motor 22). Similarly, a third short circuit line 316 connects to the second wheel circuit 28 on a first side of the pump 24 and a fourth short circuit line 318 connects to the second wheel circuit 28 on an opposite side of the second pump 24. When the valve 302 is in the first operating position 302a the first short circuit line 312 is blocked from the second short circuit line 314. Likewise, when the valve 302 is in the first operating position 302a the third short circuit line 316 is blocked from the fourth short circuit line 318. Since the short circuit lines are blocked from one another, the motors 10 and 12 are isolated from one another so that when a loss of pressure occurs the motors are inhibited from rotating.

When the valve 302 is in the second operating position 302b the first short circuit line 312 is allowed to communicate with the second short circuit line 314. Likewise, when the valve 302 is in the second operating position 302b, the third short circuit line 316 is allowed to communicate with the fourth short circuit line 318. Accordingly, fluid can travel from an outlet of the motor 10 through the first short circuit line 312 and through the valve 302 into the second short circuit line 314 and into the inlet of the motor. Similarly, fluid can exit the second motor 12 into the third short circuit line 316 and travel through the valve 302 into the fourth short circuit line 318 and back through the motor 12. Accordingly, while in the second operating position 302b both motors 10 and 12 can rotate as the prime mover is towed.

In the hydraulic circuit depicted in FIG. 6, the brakes 14 and 16 can be pressurized using an auxiliary pressure source 322, which can be a hand pump, that acts similarly to the auxiliary pressure source 70 depicted in FIG. 1. The auxiliary pressure source 322 draws fluid from downstream the primary pressure sources 22 and 24 through a filter 324 and a check valve 326. The auxiliary pressure source 322 pushes fluid through a second check valve 328 towards the brake ports 306 and 308 to pressurize the brakes 14 and 16.

The control 300 can take a similar configuration to the control 20 depicted in FIGS. 1-5; however, instead of having only two motor ports, which is the configuration depicted in FIG. 5, the control can include two additional motor ports to provide the connections for short circuiting both motors 10 and 12 without returning fluid to the tank 52. The motor port connections can be axially spaced from one another, similar to the configuration depicted in FIGS. 2-5. The rod assembly disclosed in FIGS. 2-5 would isolate the motor ports from one another in a manner that is depicted schematically in FIG. 6.

Figure 7:
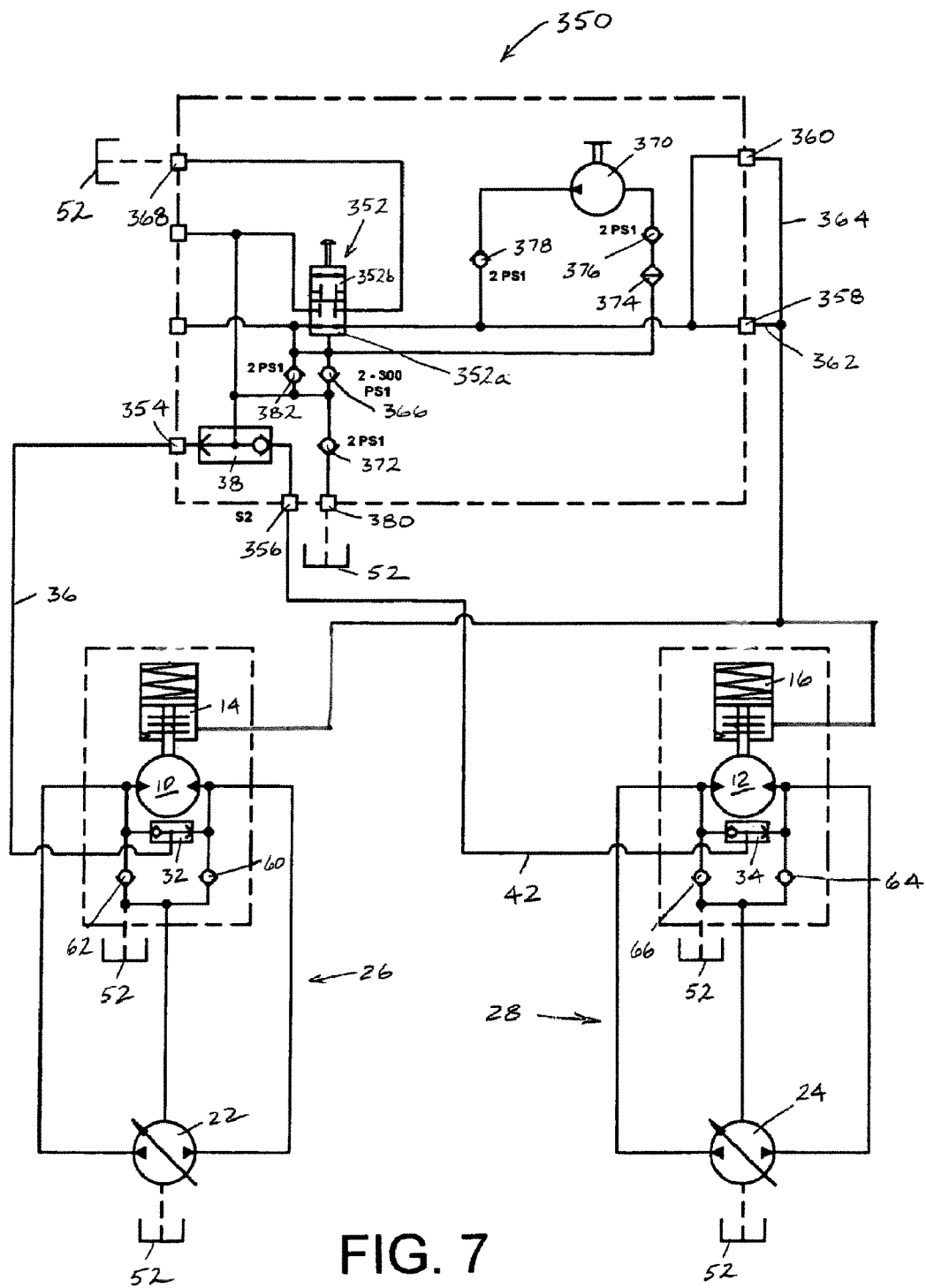
FIG. 7 is another alternative embodiment of a hydraulic circuit for a spring applied-pressure released brake and a hydraulic motor.

With reference to FIG. 7, an alternative embodiment of a hydraulic circuit that allows for the release of spring applied-hydraulically released brakes and the hydraulic motors is disclosed. The circuit disclosed in FIG. 7 can be particularly useful in providing a high pressure bypass for the hydraulic motors; however, the circuit is not limited to such configurations. The configuration of the wheel circuits for the hydraulic circuit depicted in FIG. 7 is the same as for the hydraulic circuit depicted in FIGS. 1 and 6. Therefore, the same reference numerals for the wheel circuits will be used. In the circuit depicted in FIG. 7, a control 350 is used to release the brakes 14 and 16 and short circuit the motors 10 and 12 with respect to their respective pumps 22 and 24. In this circuit, the motor bypass, i.e. the short circuit aspect of the hydraulic circuit, is a high-pressure motor bypass in that the control 350 does not reset until a predetermined pressure has been reached upstream of the control.

The control 350 includes a two position valve 352 having a first operating position 352a and second operating position 352b. In the first operating position, the brakes 14 and 16 receive pressure from primary pressure sources, e.g. pumps 22 and 24. Fluid travels from the motors 10 and 12 through lines 36 and 42 and into a shuttle valve 38, which in the embodiment depicted in FIG. 7 is disposed in the same housing (e.g. manifold) as the valve 352, as well as other components of the control 350. Because of this configuration, a first motor shuttle port 354 and a second motor shuttle port 356, each being in communication with opposite sides of the shuttle valve 38, are provided on the control 350. The first wheel circuit 26 communicates with the shuttle valve 38 through line 36 which is connected to the first motor shuttle port 354. Similarly, the second wheel circuit 28 communicates with the shuttle valve 38 through line 42 which is connected to the second motor shuttle port 356.

With the valve 352 in the first operating position 352a, fluid travels through a first check valve 366 and through the valve 352 into respective brake ports 358 and 360 to which brake lines 362 and 364 are attached in a known manner. The first check valve 366 operates at a predetermined pressure, typically the check valve opens at between about 2 psi to about 300 psi. Pumps, for example pumps 22 and 24, can maintain residual hydraulic pressure even when the pump is disposed in a neutral position. Accordingly, the first check valve 366 can preclude communication between the valve 352 and the wheel circuits 26 and 28 when the engine of the prime mover that drives the pumps 22 and 24 is idling and the pumps are not delivering fluid to the motors other than the residual pressure described. When the valve 352 is in the second position 352b, the first check valve 366 can also preclude communication with the valve 352 so that the valve 352 is not automatically reset when the prime mover is being towed and fluid is flowing through the system which may result in pressure spikes somewhere in the hydraulic circuit.

When the valve 352 is in the second operating position 352b, the shuttle valve 38 and thus the motors 10 and 12 communicate with the tank 52 via a tank port 368. Accordingly, fluid travels from the motors 10 and 12 into the shuttle valve 38 through the valve 352 in the second operating position 352b and towards the tank 52 out the tank port 368. While in the second operating position 352b, both motors 10 and 12 can rotate as the prime mover is towed.

In the hydraulic circuit depicted in FIG. 7, when the control is in the second operating position 352b the brakes 14 and 16 are pressurized using an auxiliary pressure source 370, which can be a hand pump. In the hydraulic circuit depicted in FIG. 7, the auxiliary pressure source 370 draws fluid from the tank 52 through a second check valve 372, a filter 374 and a third check valve 376. The first check valve 366 will not open in response to the vacuum being drawn by the pump 370 since the predetermined pressure at which the first valve 366 opens is higher than the vacuum pressure generated by the pump 370. The auxiliary pressure source 370 pushes fluid through a fourth check valve 378 towards the brake ports 360 and 362 to pressurize the brakes 14 and 16. The second check valve 372 provides for communication with the tank 352 for suction only. No return to the tank is provided through a second tank port 380. A fifth check valve 382, which is parallel to the first check valve 366, lets pressure out of the valve 352 while the first check valve 366 lets pressure into the valve 352.

The control 350 can take a number of configurations, many of which would be similar to the control depicted in FIGS. 1-5. With reference to FIGS. 8-11 an embodiment of the control 352 is disclosed. Nevertheless, the control is not limited to only the embodiment depicted in FIGS. 8-11. Instead, the control can take a number of configurations that are functionally equivalent to the schematic control depicted in FIG. 7. The control 350 includes a manifold housing 412 and a pump rod subassembly 114, that is identical to the pump rod subassembly described with reference to FIGS. 2-5, and therefore for the sake of brevity will not be described in further detail. The manifold housing 412 can take a number of configurations, only one is disclosed in detail.

The manifold housing 412 takes a very similar configuration to the manifold housing 112 described with reference to FIGS. 2-5 and therefore much of it will not be described in detail.

Figures 8, 9:
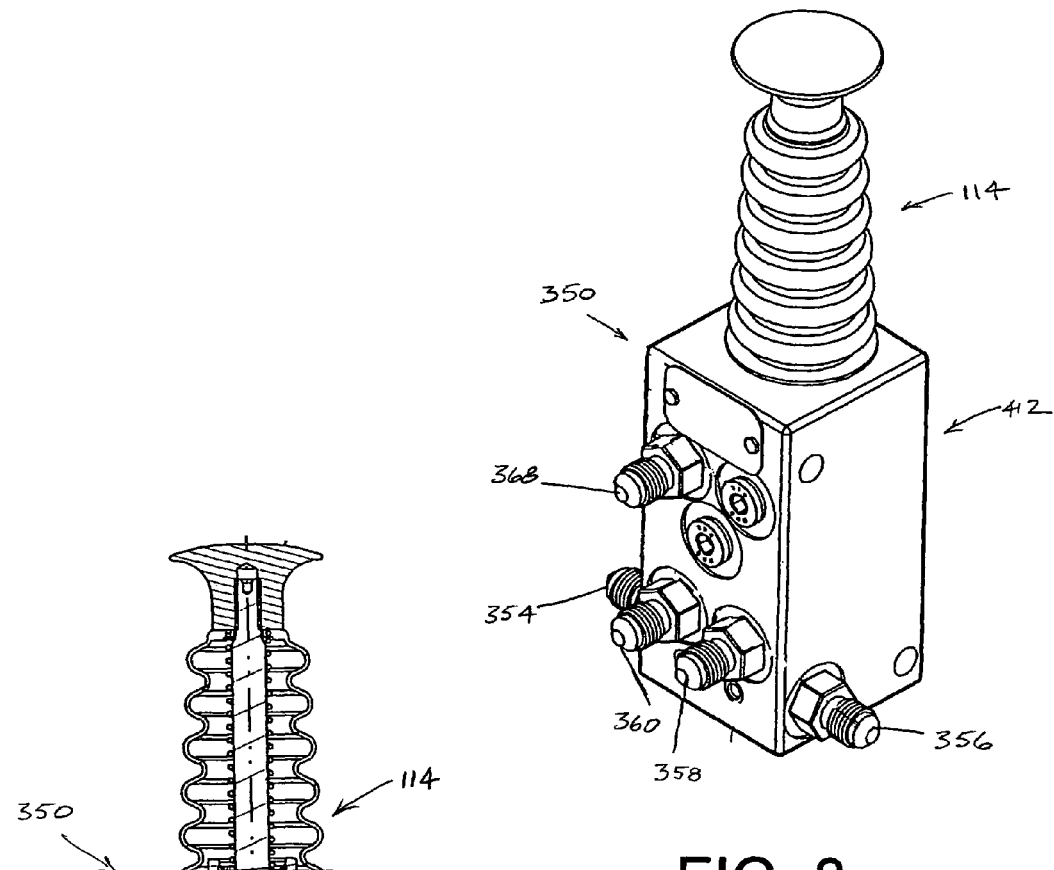
FIG. 8 is a perspective view of a control for use with the hydraulic circuit depicted in FIG. 7.
FIG. 9 is a cross-sectional view of the control depicted in FIG. 8, the control being shown in a first operating position.
Figure 10:
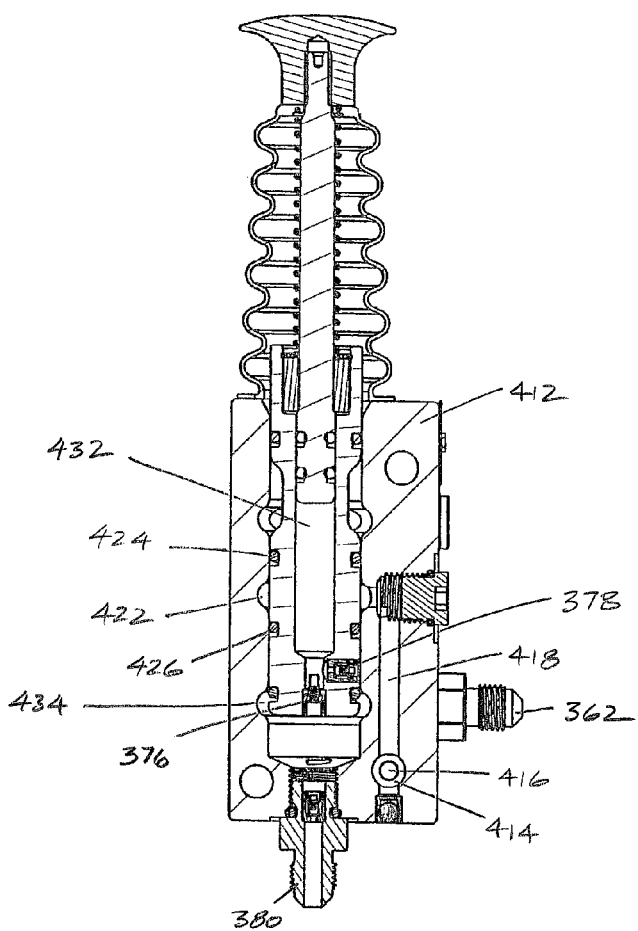
FIG. 10 is a cross-sectional view taken 900 from the cross-sectional view shown in FIG. 9 where the control was shown in the first operating position.

With reference to FIG. 9, while the control is in the first operating position lines 42 and 36 connect to motor shuttle ports 354 and 356 respectively. With reference to FIG. 10, the motor shuttle ports 354 and 356 each communicate with a passage 414 formed in a manifold housing 412. A ball 416 is disposed in the passage 414 such that the ball 416 and passage 414 operate as a shuttle valve 38 (depicted schematically in FIG. 7). Also a cartridge or press in type shuttle valve may be used. With continued reference to FIG. 10, pressurized fluid is delivered from the transverse bore 414 into an axial bore 418 that is in communication with an annular bore 422 that while the control is in the first operating position is isolated from other ports by an upper intermediate seal 424 and a lower intermediate seal 426. With reference back to FIG. 9, while the control is in the first operating position fluid passes from the transverse bore 414 (FIG. 10) through the first check valve 366 and into a central bore of the manifold 412 so that pressure is delivered to the brake lines 362 and 364 via brake ports 360 and 358 (FIG. 8). When the control 350 is in the first operating position, the shuttle valve 38 precludes direct communication between the motors 10 and 12 and the shuttle motor ports 354 and 356 are isolated from the tank 352 by the intermediate seals 424 and 426.

Figure 11:
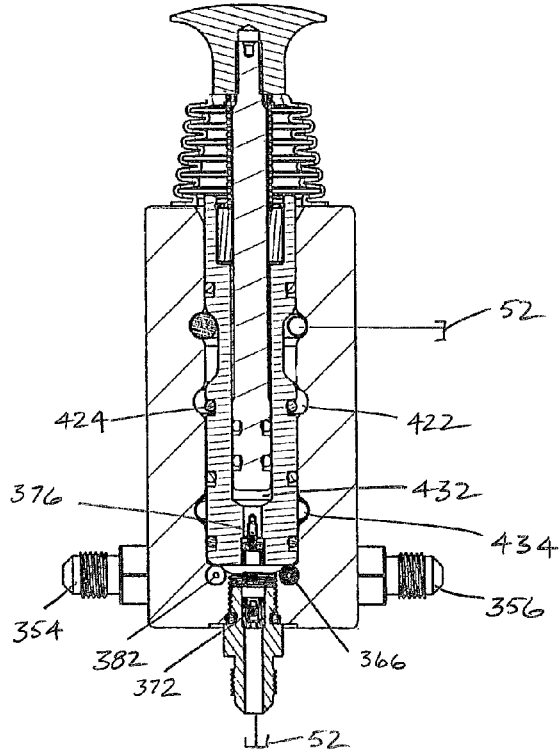
FIG. 11 is a cross-sectional view similar to that depicted in FIG. 9 where the control is shown in the second operating position.

With reference to FIG. 11, with the control in the second operating position the intermediate seal 424 is disposed in the annular bore 422 such that the annular bore 422 can now communicate with the tank 52, as seen in FIG. 11. This allows for a direct short from the motors 10 and 12 to the tank 52. Also, while the control is in the second operating position fluid can be drawn from the tank 52 through the check valve 372 and into a pump chamber 432 through another check valve 376. When in the second position, the fourth check valve 378 (FIG. 10) aligns with a lower annular bore 434 that is in communication with the brake ports 360 and 358 so that fluid is pushed through the fourth check valve 378 towards the brakes 14 and 16 (FIG. 7).

Various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Even though embodiments of the invention are disclosed above, the invention is not to be limited to only the embodiment disclosed. For example, the controls described above can take different configurations than what is disclosed in FIGS. 2-5 and 8-11 that are functionally equivalent to the configurations disclosed in FIGS. 1, 6 and 7. The invention is defined by the appended claims and the equivalents thereof.

The invention claimed is:

1. A hydraulic circuit comprising:
a spring applied-pressure released brake;
a hydraulic motor; and
a control in fluid communication with the brake and the motor, the control including a manifold having a bore and valve member received in the bore, the valve member being movable between a first position and a second position, when in the first position and in response to a pressure loss upstream of the motor, movement of fluid through the motor is inhibited such that rotation of an output shaft of the motor is inhibited, when in the first position and in response to a pressure loss upstream of the brake, the brake is spring applied, when in the first position the hydraulic motor receives pressure from a first pressure source, when in the second position the brake is in communication with an auxiliary pressure source through the bore for selectively supplying pressure to the brake, the auxiliary pressure source being at least partially defined by the valve member, and when in the second position and in response to pressure being applied by the first pressure source upstream of the control, the valve member is automatically reset to the first position wherein the control and the auxiliary pressure source are disposed in a single housing, the control including the valve member and an inner rod received in the valve member, and the inner rod being moveable with respect to the valve member to operate as the auxiliary pressure source for supplying pressure to the brake.

2. The circuit of claim 1, further defined in that when the valve member is in the second position the motor is in communication with a reservoir or ambient through the control such that the output shaft of the motor can rotate when acted upon by an external force.

3. The circuit of claim 1, further defined in that when the valve member is in the second position an inlet of the motor is in communication with an outlet of the motor through the control such that the output shaft of the motor can rotate when acted upon by an external force.

4. The circuit of claim 1, further defined in that when the valve member is in the second position fluid bypasses the first pressure source.

5. The circuit of claim 4, wherein the first pressure source delivers pressure to the brake when the valve member is in the first position.

6. The circuit of claim 1, further comprising a one-way valve upstream from or disposed in the control, the valve opening above a predetermined pressure to allow the valve member to reset when a pressure above the predetermined pressure is exerted on the valve.

7. The circuit of claim 1, wherein the control includes at least two ports that are each fluidly connected to the motor, wherein a first port of the at least two ports is blocked in the control when the control is in the second position.

8. The circuit of claim 7, wherein a second port of the at least two ports is blocked in the control when the control is in the first position.

9. The circuit of claim 8, wherein the second port is fluidly connected to a reservoir or ambient when the control is in the second position.

10. A hydraulic circuit comprising:
a spring applied-pressure released brake;
a hydraulic motor;
a first pressure source; and
a control in fluid communication with the brake and the motor, the control including a valve operative between a first position and a second position and a manual displacement member movable relative to the valve in the second position and defining a second pressure source, when in the first position the brake receives pressure from the first pressure source, and when in the second position the brake receives pressure from the second pressure source and the motor is short circuited in relation to the first pressure source, where after a pressure loss occurs at the first pressure source while in the first position the brake is in communication with the motor through the control wherein the control includes a spindle and an inner rod received in the spindle, the spindle being movable to move the control between the first position and the second position, and the inner rod being moveable with respect to the spindle to operate as the second pressure source.

11. The circuit of claim 10, further comprising a manifold housing, the valve and the second pressure source are disposed in the manifold housing.

12. The circuit of claim 10, wherein the valve is configured to automatically reset from the second position to the first position in response to pressure being applied by the first pressure source upstream from the control.

13. The circuit of claim 10, wherein when in the second position the motor communicates with an unpressurized reservoir through the control.

14. The circuit of claim 10, wherein when in the second position an inlet of the motor is in communication with an outlet of the motor through the control.

15. A prime mover comprising:
a hydraulic motor;
a bypass conduit fluidly connected with the motor;
a spring applied-pressure released brake;
a first pressure source;
a second pressure source;
a control including a manifold having a bypass outlet and a bore in communication with the bypass outlet, the manifold being fluidly connected with the bypass conduit, the brake, the first pressure source,. and the second pressure source disposed within the bore, the control further including a movable member in the bore and being operative between a first position and a second position, when in the first position the control couples the brake and the motor to the first pressure source through the bore and the bypass conduit is blocked from the bypass outlet, when in the second position the control couples the brake to the second pressure source through the bore and the bypass conduit is fluidly connected with the bypass outlet and a blocked passage to allow for a buildup of pressure on an upstream side of the control when the first pressure source supplies fluid pressure to the bypass conduit.

16. The prime mover of claim 15, wherein the bypass outlet communicates with a reservoir.

17. The prime mover of claim 15, wherein the bypass conduit communicates with an outlet of the motor and the bypass outlet communicates with an inlet of the motor.

18. The prime mover of claim 15, wherein the motor is in communication with the first pressure source.

19. The prime mover of claim 15, further comprising an additional hydraulic motor and an additional bypass conduit in communication with the additional motor, the additional bypass conduit and the bypass conduit each in communication with a valve.

20. The prime mover of claim 19, wherein the control is configured to automatically reset from the second position to the first position in response to pressure being applied by the first pressure source upstream from the control.

21. The prime mover of claim 15, wherein the second pressure source is disposed in the manifold housing.

* * * * *

UNITED STATES PATENT AND TRADEMARK OFFICE
CERTIFICATE OF CORRECTION

| | |
|---|---|
| PATENT NO. | : 7,909,414 B2 |
| APPLICATION NO. | : 11/373318 |
| DATED | : March 22, 2011 |
| INVENTOR(S) | : Richard Daigre |

Page 1 of 1

It is certified that error appears in the above-identified patent and that said Letters Patent is hereby corrected as shown below:

Col. 14, in claim 15, line 22 please remove the "." after "the first pressure source,"

Signed and Sealed this
Seventeenth Day of May, 2011

David J. Kappos
*Director of the United States Patent and Trademark Office*